United States Patent
Chen et al.

(10) Patent No.: US 12,191,478 B2
(45) Date of Patent: Jan. 7, 2025

(54) ANODE ACTIVE MATERIAL AND PREPARATION METHOD THEREOF, AND DEVICE USING THE ANODE ACTIVE MATERIAL

(71) Applicant: NINGDE AMPEREX TECHNOLOGY LIMITED, Ningde (CN)

(72) Inventors: Zhihuan Chen, Ningde (CN); Daoyi Jiang, Ningde (CN); Hang Cui, Ningde (CN); Yuansen Xie, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 974 days.

(21) Appl. No.: 17/274,810

(22) PCT Filed: Nov. 19, 2019

(86) PCT No.: PCT/CN2019/119436
§ 371 (c)(1),
(2) Date: Mar. 10, 2021

(87) PCT Pub. No.: WO2020/186799
PCT Pub. Date: Sep. 24, 2020

(65) Prior Publication Data
US 2022/0052320 A1    Feb. 17, 2022

(30) Foreign Application Priority Data
Mar. 20, 2019  (CN) .......................... 201910214567.1

(51) Int. Cl.
*H01M 4/133* (2010.01)
*H01M 4/134* (2010.01)
(Continued)

(52) U.S. Cl.
CPC .......... *H01M 4/364* (2013.01); *H01M 4/133* (2013.01); *H01M 4/134* (2013.01); *H01M 4/366* (2013.01);
(Continued)

(58) Field of Classification Search
CPC ............................... H01M 4/366; H01M 4/36
See application file for complete search history.

(56) References Cited

U.S. PATENT DOCUMENTS

| 2011/0163274 | A1 | 7/2011 | Plee et al. | |
| 2014/0227595 | A1* | 8/2014 | Upreti | H01M 4/48 429/218.1 |

(Continued)

FOREIGN PATENT DOCUMENTS

| CN | 102306759 A | 1/2012 |
| CN | 102694201 A | 9/2012 |

(Continued)

OTHER PUBLICATIONS

Supplementary European Search Report mailed Aug. 16, 2023, in European Application No. 19863966.8, 9 pages.

(Continued)

*Primary Examiner* — Olatunji A Godo
(74) *Attorney, Agent, or Firm* — XSENSUS LLP

(57) ABSTRACT

The present application relates to an anode active material and a preparation method thereof, and a device using the anode active material. The anode active material provided by the present application includes anode active particles having silicon element, a first conductive material and a second conductive material, wherein the first conductive material and the second conductive material form a three-dimensional conductive network structure, at least a portion of the anode active particles are accommodated in the three-dimensional conductive network structure, and a ratio (Continued)

of the total surface area of the first conductive material to the total surface area of the anode active particles is less than 1000. The capacity retention rate and expansion ratio of the anode active material with progression of the cycle are significantly improved.

17 Claims, 2 Drawing Sheets

(51) Int. Cl.
| | |
|---|---|
| H01M 4/36 | (2006.01) |
| H01M 4/38 | (2006.01) |
| H01M 4/48 | (2010.01) |
| H01M 4/587 | (2010.01) |
| H01M 4/62 | (2006.01) |
| H01M 10/0525 | (2010.01) |
| H01M 4/02 | (2006.01) |

(52) U.S. Cl.
CPC ............ H01M 4/386 (2013.01); H01M 4/48 (2013.01); H01M 4/587 (2013.01); H01M 4/625 (2013.01); H01M 10/0525 (2013.01); H01M 2004/021 (2013.01); H01M 2004/027 (2013.01)

(56) References Cited

U.S. PATENT DOCUMENTS

| | | | |
|---|---|---|---|
| 2015/0044571 A1* | 2/2015 | Abdelsalam | H01M 4/0404 252/182.1 |
| 2015/0303463 A1* | 10/2015 | Sasaki | H01M 4/622 252/511 |
| 2016/0028075 A1 | 1/2016 | Yu | |
| 2017/0025676 A1 | 1/2017 | Yu | |
| 2018/0351167 A1 | 12/2018 | Tojigamori et al. | |
| 2020/0176777 A1* | 6/2020 | Hellring | H01M 4/0404 |

FOREIGN PATENT DOCUMENTS

| | | |
|---|---|---|
| CN | 102709536 A | 10/2012 |
| CN | 102934266 A | 2/2013 |
| CN | 103545525 A | 1/2014 |
| CN | 104094453 A | 10/2014 |
| CN | 104134818 A | 11/2014 |
| CN | 104362346 A | 2/2015 |
| CN | 105024076 A | 11/2015 |
| CN | 105161695 A | 12/2015 |
| CN | 105280904 A | 1/2016 |
| CN | 105304858 A | 2/2016 |
| CN | 105355898 A | 2/2016 |
| CN | 105390687 A | 3/2016 |
| CN | 105406044 A | 3/2016 |
| CN | 105742572 A | 7/2016 |
| CN | 106415894 A | 2/2017 |
| CN | 106711453 A | 5/2017 |
| CN | 107799723 A | 3/2018 |
| CN | 107863497 A | 3/2018 |
| CN | 107946561 A | 4/2018 |
| CN | 108321396 A | 7/2018 |
| CN | 109167023 A | 1/2019 |
| CN | 109461937 A | 3/2019 |
| CN | 109980199 A | 7/2019 |
| EP | 3093910 A1 | 11/2016 |
| JP | 2012501515 A | 1/2012 |
| JP | 2014146519 A | 8/2014 |
| JP | 2015508934 A | 3/2015 |
| WO | 2017002288 A1 | 1/2017 |
| WO | 2017061514 A1 | 4/2017 |

OTHER PUBLICATIONS

PCT International Preliminary Report on Patentability mailed Sep. 30, 2021 in counterpart PCT application PCT/CN2019/119436, 7 pages in English.

Japanese Office Action mailed Apr. 26, 2022 in counterpart Japanese application JP2021516456, 5 pages in Japanese.

* cited by examiner

ANODE ACTIVE MATERIAL AND PREPARATION METHOD THEREOF, AND DEVICE USING THE ANODE ACTIVE MATERIAL

CROSS REFERENCE TO RELATED APPLICATIONS

The present application is a National Stage application of PCT international application: PCT/CN2019/119436 which claims the benefit of priority from the China Patent Application No. 201910214567.1, filed on 20 Mar. 2019, the disclosure of which is hereby incorporated by reference in its entirety.

BACKGROUND

1. Field of the Invention

The present application relates to the field of energy storage, and more particularly to an anode active material and a preparation method thereof, and a device using the anode active material.

2. Description of the Related Art

With the popularity of electronic products such as notebook computers, mobile phones, handheld game consoles and tablet computers, the requirements for electrochemical devices (for example, batteries) are more and more stringent. In the plurality of batteries, compared with lead-acid batteries, nickel-cadmium batteries, nickel-hydrogen batteries and the like, the lithium ion battery has the advantages of high energy storage density, large power density, good safety, environmental friendliness, long service life, low self-discharge rate, wide temperature adaptation range and the like. As an important part of the lithium ion battery, anode materials have a significant impact on its performance, so the continuous optimization and improvement of the anode materials are particularly important.

SUMMARY

Silicon has been considered to be the most probable lithium ion anode material for large-scale applications because of its reversible capacity of up to 4200 mAh/g. However, after several charge and discharge cycles, the silicon material undergoes a large volume change with the intercalation and deintercalation of lithium ions, and the volume expansion ratio may reach 300%, thereby generating huge mechanical stress. This will cause pulverization of silicon particles and debonding of the active material from a current collector, thereby lowering the cycle performance of a lithium ion battery. At the same time, the conductivity of silicon is poor, which will cause severe polarization and further lower its cycle performance.

At present, the main methods for solving the large volume change and poor conductivity during the cycle of silicon materials are nanocrystallization of silicon materials, complexing of silicon-containing materials with graphite or other materials (metal or non-metal) and optimization of binders for silicon anodes. However, the nano material is prone to agglomeration and has a large specific surface area ($>100$ m$^2$/g), thereby consuming more electrolyte to form a solid electrolyte interfacial film (SEI film), and causing problems of reduction of first coulombic efficiency and reduction of conductivity, which will limit the further application of the nano silicon material. The use of good electrical conductivity and ductility of materials such as graphite may greatly alleviate the volume expansion of the silicon material during the cycle and enhance the conductivity of a system. A silicon-containing composite material may play a certain restraining role in the early stage of the cycle. However, as the cycle progresses, the silicon expansion is not well suppressed, and the performance of the battery is drastically lowered. Moreover, the binder currently used still cannot match the huge stress (up to 1 Gpa) of silicon generated during the volume expansion and contraction, and the binder is prone to fatigue failure during the cycle.

Therefore, new improvements are needed to enable the silicon material to have better cycle performance.

According to a first aspect of the present application, the present application provides an anode active material, including anode active particles having silicon element, a first conductive material and a second conductive material, wherein the first conductive material and the second conductive material form a three-dimensional conductive network structure, at least a portion of the anode active particles are accommodated in the three-dimensional conductive network structure, a ratio of the total surface area of the first conductive material to the total surface area of the anode active particles is less than about 1000.

In some embodiments, the first conductive material has a length to diameter ratio of about 50 to about 3000 and a diameter of about 2 nm to about 30 nm, and the second conductive material has a length to diameter ratio of about 20 to about 500 and a diameter of about 50 nm to about 500 nm.

In some embodiments, the anode active particles have an average diameter D50 of about 0.5 μm to about 30 μm, and the average length L50 of the second conductive material and the D50 of the anode active particles satisfy: (L50−D50)/D50≥1.

In some embodiments, a mass ratio of the first conductive material to the second conductive material is about 0.01 to about 0.5.

In some embodiments, the mass of the first conductive material accounts for about 5% to about 30% of the mass of the total conductive materials.

In some embodiments, a ratio of the total mass of the first conductive material and the second conductive material to the total mass of the anode active particles is about 1:5-100.

In some embodiments, the first conductive material includes carbon nanotubes containing at least one polar group, and the second conductive material includes carbon fibers.

In some embodiments, the polar group is selected from the group consisting of a hydroxyl group, a carboxyl group, a sulfonic acid group, an epoxy group and an amino group, and a combination thereof.

In some embodiments, the carbon nanotubes include single-walled carbon nanotubes, multi-walled carbon nanotubes or a combination of them.

In some embodiments, the carbon fibers include vapor grown carbon fibers (VGCFs), carbon nanofibers or a combination of them.

In some embodiments, the first conductive material is bonded to a surface of the anode active particles by one or more covalent bonds.

In some embodiments, the anode active particles include a simple substance of silicon, a compound of silicon, an alloy of silicon or any combination of the above.

In some embodiments, the anode active particles include SiOx, x=0.5-1.5, and the SiOx includes crystalline SiOx, amorphous SiOx or a combination of them.

In some embodiments, at least a portion of the surface of the anode active particles is coated with an oxide.

In some embodiments, the oxide includes a metal oxide, a non-metal oxide or a combination of them.

In some embodiments, the anode active material further includes a third conductive material, wherein the mass of the third conductive material accounts for about 1% to about 20% of the mass of the total conductive materials.

In some embodiments, the third conductive material includes conductive carbon black, acetylene black, Ketjen black, conductive graphite, graphene or any combination of the above.

In some embodiments, the anode active particles further include a carbon material.

In some embodiments, the carbon material includes artificial graphite, natural graphite or a combination thereof, wherein the artificial graphite or the natural graphite includes mesocarbon microbeads, soft carbon, hard carbon or any combination of the above.

In some embodiments, the anode active material further includes a binder.

In some embodiments, the binder includes polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium or any combination of the above.

According to a second aspect of the present application, the present application provides an anode, including a current collector and the anode active material according to the foregoing, wherein the anode active material is coated on at least one surface of the current collector.

In some embodiments, the anode has a thickness of about 50 μm to about 200 μm, a single to sided compacted density of about 1.2 $g/cm^3$ to about 2.0 $g/cm^3$ and a resistivity of about 0.001 Ω·cm to about 1000 Ω·cm.

In some embodiments, a peel strength between the anode active material and the current collector is greater than about 20 N/m.

According to a third aspect of the present application, the present application provides an electrochemical device, including: a cathode; the anode according to the foregoing; a separator; and electrolyte.

According to a fourth aspect of the present application, the present application provides an electronic device, including the electrochemical device according to the foregoing.

According to a fifth aspect of the present application, the present application provides a method for preparing an anode active material slurry, including: (a) mixing anode active particles having silicon element, a first conductive material and a solvent to obtain a first mixed slurry; (b) adding a second conductive material and a solvent to the first mixed slurry to obtain a second mixed slurry; and (c) filtering the second mixed slurry to obtain an anode active material slurry, wherein the first conductive material and the second conductive material form a three-dimensional network structure, at least a portion of the anode active particles having silicon are accommodated in the three-dimensional network structure, and a ratio of the total surface area of the first conductive material to the total surface area of the anode active particles is less than about 1000.

In some embodiments, a binder is further added in step (a), wherein the binder is selected from the group consisting of polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium and a combination thereof.

In some embodiments, a third conductive material is further added to the first mixed slurry in step (b), wherein the third conductive material is selected from the group consisting of conductive carbon black, acetylene black, Ketjen black, conductive graphite, graphene and a combination thereof.

In some embodiments, a carbon material is further added to the first mixed slurry in step (b), wherein the carbon material is selected from the group consisting of artificial graphite, natural graphite, mesocarbon microbeads, soft carbon, hard carbon and a combination thereof.

In some embodiments, a binder is further added in step (b), wherein the binder is selected from the group consisting of polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium and a combination thereof.

In some embodiments, the viscosities of the first mixed slurry and the second mixed slurry are controlled by controlling the amounts of the solvents in step (a) and step (b).

In some embodiments, the solvents in step (a) and step (b) include deionized water or N-methylpyrrolidone.

The additional aspects and advantages of the embodiments of this application are described or showed in the following description or set forth through implementation of the embodiments of this application.

BRIEF DESCRIPTION OF THE DRAWINGS

The drawings illustrate an implementation solution of the present application and are used together with the above-mentioned description for further understanding the technical purpose of the present application. However, the scope claimed by the present application shall not be limited to the drawings.

DETAILED DESCRIPTION

Figure 1:
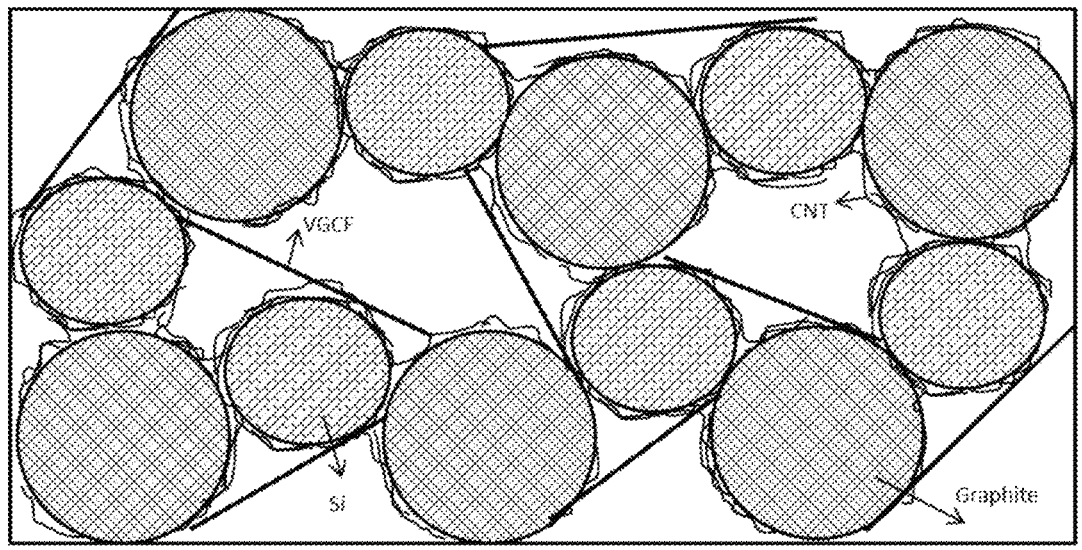
FIG. 1 is a schematic view of a three-dimensional conductive network formed by a conductive material in a silicon-containing anode active material of the present application.

The present application will be described below in detail. It shall be understood that terms used in the specification and the annexed claims shall not be explained as limited to meanings in a common sense and dictionaries but be explained based on meanings and concepts corresponding to the technical aspects of the present application on the basis of the principle that the inventor is allowed to properly define the terms to make an optimum explanation. Therefore, the implementation solution in the specification and the description in the drawings are only specific examples used for the purpose of description rather than intentions to illustrate all technical aspects of the present application, and it shall be understood that, when the present application is filed, various alternative equivalents and variants may be completed thereto.

As used herein, the terms "substantially", "generally", "essentially" and "about" are used to describe and explain small variations. When being used in combination with an event or circumstance, the term may refer to an example in which the event or circumstance occurs precisely, and an example in which the event or circumstance occurs approximately. For example, when used in conjunction with a numerical value, the terms may refer to a variation range that is less than or equal to ±10% of the numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, if a difference between two values is less than or equal to ±10% of the average of the values (e.g., less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%), the two values may be considered "substantially" the same.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

I. Anode Active Material

The present application provides an anode active material, including anode active particles having silicon element, a first conductive material and a second conductive material, where:
- the first conductive material and the second conductive material form a three-dimensional conductive network structure;
- at least a portion of the anode active particles are accommodated in the three-dimensional conductive network structure; and
- a ratio of the total surface area of the first conductive material to the total surface area of the anode active particles is less than about 1000.

In some embodiments, the anode active particles have an average diameter D50 of about 0.5 μm to about 30 μm. In some embodiments, the anode active particles have an average diameter D50 of about 1.0 μm to about 20 μm. D50 is a particle diameter of the anode active particles from a small particle diameter side to a volume accumulation of 50% in a volume-based particle size distribution. The average particle diameter D50 of the anode active particles may be measured by a Malvern particle size tester: the anode material is dispersed in a dispersing agent (ethanol or acetone, or other surfactants), and after 30 min of ultrasound, the sample is added to the Malvern particle size tester to start a test.

In the embodiments of the present application, the average particle diameter (D50) of the silicon particles is controlled. When the D50 of the silicon particles is <about 0.5 μm, the total surface area of the silicon particles is too large, which will consume more electrolyte, thereby worsening the first coulombic efficiency and cycle performance of a prepared lithium ion battery. When the D50 of the silicon particles is >about 30 μm, the size of the silicon particles is too large, and the volume expansion is large after lithium intercalation, so that large internal stress of the silicon particles is caused and cannot be released in time, which easily causes micro-cracks or even breakage of the silicon particles. An SEI film is repeatedly broken and formed, thereby worsening the electrochemical performance of the lithium ion battery prepared therefrom. Therefore, the size of the silicon particles needs to be controlled within a reasonable range.

In some embodiments, the anode active particles include a simple substance of silicon, a compound of silicon, an alloy of silicon or any combination of the above. In some embodiments, the anode active particles include SiOx, x=0.5-1.5, and the SiOx includes crystalline SiOx, amorphous SiOx or a combination of them.

In some embodiments, at least a portion of the surface of the anode active particles is coated with an oxide. In some embodiments, the oxide includes a metal oxide, a non-metal oxide or a combination of them.

In some embodiments, the anode active particles further include a carbon material. In some embodiments, the carbon material includes artificial graphite, natural graphite or a combination thereof. In some embodiments, the artificial graphite or natural graphite includes mesocarbon microbeads, soft carbon, hard carbon or any combination of the above.

A ratio of the total surface area of the first conductive material to the total surface area of the anode active particles is less than about 1000. In some embodiments, the ratio of the total surface area of the first conductive material to the total surface area of the anode active particles is less than about 500. In some embodiments, the ratio of the total surface area of the first conductive material to the total surface area of the anode active particles is less than about 200. In some embodiments, the ratio of the total surface area of the first conductive material to the total surface area of the anode active particles is less than about 50. In some embodiments, the ratio of the total surface area of the first conductive material to the total surface area of the anode active particles is less than about 20.

The total surface area of the material may be calculated after firstly measuring a specific surface area by a BET (Brunauer-Emmett-Teller) test method. According to the BET test method, a Tri Star II specific surface analyzer is firstly adopted. 3 g to 6 g of sample is loaded in a sample tube, and then the sample is put into a degassing station. The sample is heated and vacuumed. Then heating and vacuuming are shut down such that the temperature of the sample is lowered to room temperature. The sample and the sample tube are removed and the masses of the sample and the sample tube are measured, and then the sample is loaded into an analysis station for analysis. Data processing and calculation are performed to obtain the specific surface area (in $m^2/g$) of the material. The specific surface area (in $m^2/g$) of the material is multiplied by the total mass (in g) of the material to obtain the total surface area (in $m^2$) of the material.

In some embodiments, the first conductive material has a length-diameter ratio (i.e., length to diameter) of about 50 to about 3000. In some embodiments, the first conductive material has the length-diameter ratio (i.e., length to diameter) of about 100 to about 2000. In some embodiments, the first conductive material has a diameter of about 2 nm to about 30 nm. The diameter of the material may be obtained by a statistical method. Conductive material powder is placed under an electron microscope (TEM or SEM), and the average value of the diameters of more than 100 pieces of conductive material is randomly calculated, which is the diameter of the material. The length of the material may also be obtained by a statistical method. Firstly, the conductive material powder is dispersed in a dispersing agent (ethanol or acetone, or other surfactants). The conductive material has a solid content of less than 0.1 wt %. After 30 min of ultrasound, a small amount of conductive material slurry is absorbed by a rubber-head dropper and uniformly coated on a copper foil or another carrier, and then observed under an electron microscope (TEM or SEM). An average value of the lengths of more than 100 pieces of conductive material is randomly calculated, which is the length of the material. However, the test methods of the length and the diameter of the material are not limited to the above test methods, and may include other test methods known to those skilled in the art.

In some embodiments, the mass of the first conductive material accounts for about 5% to about 30% of the mass of the total conductive material. In some embodiments, the mass of the first conductive material accounts for about 7% to about 27% of the mass of the total conductive material. In some embodiments, the mass of the first conductive material accounts for about 10% to about 26% of the mass of the total conductive material. In some embodiments, the mass of the first conductive material accounts for about 10% to about 15% of the mass of the total conductive material.

In some embodiments, the first conductive material is bonded to a surface of the anode active particles by one or more covalent bonds.

In some embodiments, the first conductive material includes CNTs, the surface of the CNTs contains a polar group, and the polar group includes the group consisting of a hydroxyl group, a carboxyl group, a sulfonic acid group, an epoxy group and an amino group, and a combination thereof. The CNTs may be more uniformly dispersed in a water system. The polar group on the surface of the CNTs may form a bonding effect with the groups on the surface of the silicon particles, which allows the CNTs to be better coated on the surface of the silicon particles and to bridge between the particles. The bonding effect allows the CNTs to be firmly coated on the surface of the silicon particles. Even in the large volume change during the lithium deintercalation of the silicon particles, the CNTs are not easily detached from the surface of the silicon particles, thereby effectively achieving the effect of restraining the volume expansion of the silicon particles. The CNTs are coated on the surface of the silicon particles, which may effectively enhance the conductivity of the silicon material. During the cycle, the CNTs are not detached, so that the conductivity of the silicon material may be effectively maintained as the cycle deepens, and the conductive network is effective and stable. However, the content of the CNTs should not be too high (i.e., should not exceed about 30% of the mass of the total conductive materials), excessive CNTs will increase the slurry processing difficulty (the dispersion uniformity of the slurry is reduced; the viscosity is high, and it is required to add a large amount of water to reduce the viscosity, resulting in reduction in solid content and reduction in coating uniformity; CNTs are easy to agglomerate, slurry screening is difficult and time-consuming, etc.), thereby lowering the first coulombic efficiency and capacity of the battery and worsening the cycle performance. If the quantity of the CNTs is too small (less than about 5% of the mass of the total conductive materials), the silicon material cannot be coated well, and the effects of increasing the conductivity of the silicon material and suppressing the expansion of the silicon material during the cycle will be significantly reduced.

In some embodiments, the second conductive material has a length-diameter ratio of about 20 to about 500. In some embodiments, the second conductive material has the length-diameter ratio of about 40 to about 200. In some embodiments, the second conductive material has a diameter of about 50 nm to about 500 nm.

In some embodiments, the average length L50 of the second conductive material and the D50 of the anode active particles satisfy a relation: $(L50-D50)/D50 \geq 1$, wherein the L50 and the D50 are both in μm.

In some embodiments of the present application, the second conductive material includes VGCFs, and the VGCFs have the characteristic of high rigidity (elastic modulus up to 1000 GPa). The VGCFs are interspersed between the active particles, and may suppress the displacement of the silicon particles and reduce the volume expansion of the silicon anode material after the lithium intercalation expansion of the silicon particles. If the average length L50 of the VGCFs is equivalent to or smaller than the average particle diameter D50 of the silicon particles, the VGCFs are only adhered to the surface of the silicon particles, cannot be effectively bridged between the particles, and thus, cannot have an effect of effectively suppressing the displacement of the silicon particles. When the average length L50 of the VGCFs and the average particle diameter D50 of the silicon particles satisfy the relation $(L50-D50)/D50 \geq 1$, the VGCFs may be effectively bridged between two or more particles through the binder, suppress the displacement of the silicon particles, enhance adhesion between the particles and adhesion between the active material and the current collector, have the effect of restraining the volume expansion of the silicon particles, and ensure the structural stability of the electrode during the cycle. In some embodiments, a ratio of the total mass of the first conductive material and the second conductive material to the total mass of the anode active particles is about 1:5-100. In some embodiments, the ratio of the total mass of the first conductive material and the second conductive material to the total mass of the anode active particles is about 1:10-90. In some embodiments, the ratio of the total mass of the first conductive material and the second conductive material to the total mass of the anode active particles is about 1:20-80.

In some embodiments, the first conductive material includes carbon nanotubes containing at least one polar group, and the second conductive material includes carbon fibers. In some embodiments, the polar group is selected from the group consisting of a hydroxyl group, a carboxyl group, a sulfonic acid group, an epoxy group and an amino group, and a combination thereof. In some embodiments, the carbon nanotubes include single-walled carbon nanotubes, multi-walled carbon nanotubes or a combination of them. In some embodiments, the carbon fibers include vapor grown carbon fibers (VGCFs), carbon nanofibers or a combination of them.

In some embodiments of the present application, the first conductive material (for example, carbon nanotubes (CNTs) selected from the group consisting of single-walled carbon nanotubes, multi-walled carbon nanotubes and a combination thereof) and the second conductive material (for example, carbon fibers selected from the group consisting of vapor grown carbon fibers (VGCFs), nanofibers and a combination thereof) are used to form an effective three-dimensional conductive network, so that the silicon particles are accommodated in the three-dimensional conductive network (referring to the schematic view of FIG. 1 and the SEM images of FIG. 2), thereby suppressing the expansion of the silicon particles during the cycle, enhancing the conductivity between particles, and further improving the electrochemical performance of the lithium ion battery.

In some embodiments, the addition of an additional third conductive material may increase electrical contact between the silicon particles, and electrical contact between the silicon particles and graphite particles, thereby making the three-dimensional conductive network more complete and more advantageous for enhancing the cycle performance.

In some embodiments, the anode active material further includes a binder. In some embodiments, the binder is selected from the group consisting of polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium and a combination thereof.

II. Preparation Method of Anode Material

The present application provides a method for preparing an anode active material slurry, including:
(a) mixing anode active particles having silicon element, a first conductive material and a solvent to obtain a first mixed slurry;
(b) adding a second conductive material and a solvent to the first mixed slurry to obtain a second mixed slurry; and
(c) filtering the second mixed slurry to obtain an anode active material slurry.
where
the first conductive material and the second conductive material form a three-dimensional conductive network structure;
at least a portion of the anode active particles having silicon are accommodated in the three-dimensional conductive network structure; and
a ratio of the total surface area of the first conductive material to the total surface area of the anode active particles is less than about 1000.

In some embodiments, a binder is further added in step (a), wherein the binder is selected from the group consisting of polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium and a combination thereof.

In some embodiments, a third conductive material is further added to the first mixed slurry in step (b).

In some embodiments, a carbon material is further added to the first mixed slurry in step (b), the carbon material is artificial graphite, natural graphite or a combination thereof, the artificial graphite or the natural graphite includes mesocarbon microbeads, soft carbon, hard carbon or any combination of the above.

In some embodiments, a binder is further added in step (b) wherein the binder is selected from the group consisting of polyacrylate, polyimide, polyamide, polyamideimide, polyvinylidene fluoride, styrene butadiene rubber, sodium alginate, polyvinyl alcohol, polytetrafluoroethylene, polyacrylonitrile, carboxymethylcellulose sodium, carboxymethylcellulose potassium, hydroxymethylcellulose sodium, hydroxymethylcellulose potassium and a combination thereof.

In some embodiments, the viscosities of the first mixed slurry and the second mixed slurry are controlled by controlling the amounts of the solvents in step (a) and step (b).

In some embodiments, the solvents in step (a) and step (b) include deionized water or N-methylpyrrolidone.

In some embodiments, the ratio of the total surface area of the first conductive material to the total surface area of the anode active particles is less than about 1000. In some embodiments, the ratio of the total surface area of the first conductive material to the total surface area of the anode active particles is less than about 500. In some embodiments, the ratio of the total surface area of the first conductive material to the total surface area of the anode active particles is less than about 200. In some embodiments, the ratio of the total surface area of the first conductive material to the total surface area of the anode active particles is less than about 50. In some embodiments, the ratio of the total surface area of the first conductive material to the total surface area of the anode active particles is less than about 20.

In some embodiments, the anode active particles include SiOx, x=0.5-1.5, and the SiOx includes crystalline SiOx, amorphous SiOx or a combination of them. In some embodiments, at least a portion of the surface of the anode active particles is coated with an oxide. In some embodiments, the oxide includes a metal oxide, a non-metal oxide or a combination of them.

In some embodiments, the anode active particles have an average diameter D50 of about 0.5 µm to about 30 µm. In some embodiments, the anode active particles have the average diameter D50 of about 1.0 µm to about 20 µm. In some embodiments, the first conductive material has a length to diameter ratio (i.e., length to diameter) of about 50 to about 3000. In some embodiments, the first conductive material has the length to diameter ratio (i.e., length to diameter) of about 100 to about 2000. In some embodiments, the first conductive material has a diameter of about 2 nm to about 30 nm.

In some embodiments, the mass of the first conductive material accounts for about 5% to about 30% of the mass of the total conductive materials. In some embodiments, the mass of the first conductive material accounts for about 7% to about 27% of the mass of the total conductive materials. In some embodiments, the mass of the first conductive material accounts for about 10% to about 26% of the mass of the total conductive materials. In some embodiments, the mass of the first conductive material accounts for about 10% to about 15% of the mass of the total conductive materials.

In some embodiments, the first conductive material includes carbon nanotubes containing at least one polar group, and the second conductive material includes carbon fibers. In some embodiments, the polar group is selected from the group consisting of a hydroxyl group, a carboxyl group, a sulfonic acid group, an epoxy group and an amino group, and a combination thereof. In some embodiments, the carbon nanotubes include single-walled carbon nanotubes, multi-walled carbon nanotubes or a combination of them. In some embodiments, the carbon fibers include vapor grown carbon fibers (VGCFs), carbon nanofibers or a combination of them.

In some embodiments, the first conductive material is bonded to a surface of the anode active particles by one or more covalent bonds.

In some embodiments, the second conductive material has a length-diameter ratio of about 20 to about 500. In some embodiments, the second conductive material has the length-diameter ratio of about 40 to about 200. In some embodiments, the second conductive material has a diameter of about 50 nm to about 500 nm.

In some embodiments, the average length L50 of the second conductive material and the D50 of the anode active particles satisfy a relation: (L50−D50)/D50≥1. The L50 and the D50 are both in μm.

In some embodiments, a ratio of the total mass of the first conductive material and the second conductive material to the total mass of the anode active particles is about 1:5-100. In some embodiments, the ratio of the total mass of the first conductive material and the second conductive material to the total mass of the anode active particles is about 1:10-90. In some embodiments, the ratio of the total mass of the first conductive material and the second conductive material to the total mass of the anode active particles is about 1:20-80. In some embodiments, the third conductive material is selected from the group consisting of conductive carbon black, acetylene black, Ketjen black, conductive graphite, graphene and a combination thereof. In some embodiments, the mass of the third conductive material accounts for about 1% to about 20% of the mass of the total conductive materials.

III. Anode

The present application provides an anode, including a current collector and any of the foregoing anode active materials, wherein the anode active material is coated on at least one surface of the current collector.

In some embodiments, the anode has a thickness of about 50 μm to about 200 μm, a single-sided compacted density of about 1.2 g/cm$^3$ to about 2.0 g/cm$^3$ and a resistivity of about 0.001 Ω·cm to about 1000 Ω·cm.

In some embodiments, the anode has the thickness of about 70 μm to about 150 μm. In some embodiments, the anode has the thickness of about 80 μm to about 100 μm.

In some embodiments, the anode has the single to sided compacted density of about 1.4 g/cm$^3$ to about 1.8 g/cm$^3$. In some embodiments, the anode has the single to sided compacted density of about 1.5 g/cm$^3$ to about 1.7 g/cm$^3$.

In some embodiments, the anode has the resistivity of about 0.01 Ω·cm to about 100 Ω·cm. In some embodiments, the anode has the resistivity of about 0.02 Ω·cm to about 50 Ω·cm.

In some embodiments, a peel strength between the anode active material and the current collector is greater than about 20 N/m.

In some embodiments of the present application, the anode current collector may be, but not limited to, copper foil or nickel foil.

IV. Electrochemical Device

The present application provides an electrochemical device, including a cathode, the anode according to the foregoing, a separator and electrolyte.

In some embodiments, the electrochemical device of the present application includes, but not limited to, all types of primary batteries, secondary batteries, fuel cells, solar cells or capacitors. In some embodiments, the electrochemical device is a lithium rechargeable battery. In some embodiments, the lithium rechargeable battery includes, but not limited to, a lithium metal rechargeable battery, a lithium ion rechargeable battery, a lithium polymer rechargeable battery or a lithium ion polymer rechargeable battery.

In some embodiments, the electrochemical device is a lithium ion battery and is prepared by using the following method:

Preparation of anode: The filtered anode active material slurry obtained in step (c) according to the foregoing method is coated onto a current collector; and the electrode is dried or cold-pressed to obtain the anode.

In some embodiments, the coating thickness of the anode material is about 50 μm to 200 μm.

In some embodiments, the anode has the single-sided compacted density of about 1.2 g/cm$^3$ to about 2.0 g/cm$^3$.

Preparation of cathode: a cathode active material (lithium cobalt oxide, lithium manganate, lithium iron phosphate or the like), a conductive material and a cathode binder are dispersed in a solvent system according to a certain mass ratio, and are sufficiently stirred and uniformly mixed, and then the mixture is applied to a cathode current collector. After drying and cold pressing, the cathode is obtained.

In some embodiments, the conductive material improves the conductivity of the cathode active material by providing a conductive path to the cathode active material. The conductive material may include at least one of acetylene black, Ketjen black, natural graphite, carbon black, carbon fiber, metal powder or metal fiber (for example, copper, nickel, aluminum or silver), but examples of the conductive material are not limited thereto. Any suitable conductive material available in the art may be used. In some embodiments, the amount of the conductive material may be appropriately adjusted. Based on 100 parts by weight of the cathode active material, the conductive material and the binder, the amount of the conductive material ranges from about 1 part by weight to about 30 parts by weight.

In some embodiments, examples of the solvent include N-methylpyrrolidone, acetone or water, but the present disclosure is not limited thereto, and any suitable solvent available in the art may be used. In some embodiments, the amount of the solvent may be appropriately adjusted.

In some embodiments, the binder may assist in bonding between the active material and the conductive material, or assist in bonding between the active material and the current collector. Examples of the binder include polyvinylidene fluoride, polyvinylidene chloride, carboxymethylcellulose, polyvinyl acetate, polyvinylpyrrolidone, polypropylene, polyethylene and various polymers, but the present disclosure is not limited thereto. Any suitable binder available in the art may be used. Based on 100 parts by weight of the active material, the conductive material and the binder, the amount of the binder ranges from about 1 to about 30 parts by weight.

In some embodiments, the current collector has the thickness in the range of from about 3 microns to about 20 microns, but the present disclosure is not limited thereto. The current collector is not particularly limited as long as the current collector is electrically conductive and does not cause adverse chemical changes in the manufactured battery. Embodiments of the current collector include copper, stainless steel, aluminum, nickel, titanium or an alloy (for example, a copper-nickel alloy), but the present disclosure is not limited thereto. In some embodiments, fine irregularities (for example, surface roughness) may be included on the surface of the current collector to enhance adhesion of the surface of the current collector to the active material. In some embodiments, the current collector may be used in a variety of forms, and embodiments thereof include films, sheets, foils, meshes, porous structures, foams or nonwovens, but the present disclosure is not limited thereto.

Separator: Polyethylene (PE) porous polymeric films are used as the separator. The material of the separator may include glass fiber, polyester, polyethylene, polypropylene, polytetrafluoroethylene or a combination thereof. Pores in the separator have a diameter in the range from about 0.01 micron to about 1 micron, and the separator has a thickness in the range from about 5 microns to about 500 microns.

Electrolyte: the electrolyte includes an organic solvent, a lithium salt and an additive. The organic solvent includes at least one of ethylene carbonate (EC), propylene carbonate (PC), diethyl carbonate (DEC), ethyl methyl carbonate (EMC), dimethyl carbonate (DMC), propylidene carbonate and ethyl propionate. The lithium salt includes at least one of an organic lithium salt or an inorganic lithium salt. The lithium salt includes at least one of: lithium hexafluorophosphate ($LiPF_6$), lithium tetrafluoroborate ($LiBF_4$), lithium difluorophosphate ($LiPO_2F_2$), lithium bis(trifluoromethanesulphonyl)imide $LiN(CF_3SO_2)_2$ (LiTFSI), lithium bis(fluorosulfonyl)imide $Li(N(SO_2F)_2$ (LiFSI), lithium bis(oxalato) borate $LiB(C_2O_4)_2$ (LiBOB), and lithium difluoro(oxalato) borate $LiBF_2(C_2O_4)$ (LiDFOB).

The cathode, the separator and the anode are sequentially stacked to enable the separator to be located between the cathode and anode to play a role of separation. The stack is wound to obtain a bare battery core. The wound bare battery core is placed in an outer package, and is packaged after the electrolyte is injected, and a complete battery core is obtained through formation, degassing, trimming and other processes.

V. Electronic Device

The present application provides an electronic device, including the electrochemical device according to the foregoing.

In some embodiments of the present application, the electronic device includes, but not limited to: a notebook computer, a pen-input computer, a mobile computer, an e-book player, a portable phone, a portable fax machine, a portable copier, a portable printer, a head-mounted stereo headphone, a video recorder, an LCD TV, a portable cleaner, a portable CD player, a Mini disc, a transceiver, an electronic notebook, a calculator, a memory card, a portable recorder, a radio, a backup power source, a motor, a vehicle, a motorcycle, a motorbicycle, a bicycle, a lighting apparatus, a toy, a game console, a clock, an electric tool, a flashing light, a camera, a large battery for household use, or a lithium ion capacitor.

VI. Specific Examples

The present application will be further described in detail below in conjunction with the examples. However, it should be understood that the following examples are merely for illustration, and implementing manners of the present application are not limited thereto.

1. Preparation of Anode Active Material

The anode materials of Examples 1-11 and Comparative Examples 1-5 were prepared according to the following method:

(1) About 300 g of silicon-containing material ($SiO_x$, x=0.5-1.5, and the average particle diameter D50 of particles was about 6 μm), about 2700 g of graphite material, about 40 g of conductive material (the total amount of carbon nanotubes (CNTs) and vapor grown carbon fibers (VGCFs) is about 40 g), about 120 g of binder and about 0 to 12 g of other conductive material were respectively weighed.

The other conductive material was selected from the group consisting of conductive carbon black, acetylene black, Ketjen black, conductive graphite, graphene and a combination thereof.

The binder was selected from the group consisting of polyacrylic acid, sodium alginate, hydroxymethylcellulose sodium and a combination thereof.

The CNTs were CNTs having a polar group or CNTs having no polar group, and the polar group of the CNTs was selected from the group consisting of a hydroxyl group, a carboxyl group, a sulfonic acid group, an epoxy group and an amino group, and a combination thereof.

The VGCFs were VGCFs whose size satisfied the relation (L50−D50)/D50≥1 with the silicon particle size or VGCFs whose size did not satisfy the relation (L50−D50)/D50≥1 with the silicon particle size, wherein the L50 and the D50 were both in μm.

(2) About 300 g of the silicon-containing material, all the weighed CNT powder, about 40% to 60% by mass of the weighed binder and an appropriate amount of ionized water were added to an MSK-SFM-10 vacuum stirrer. The revolution speed was controlled at about 10 r/min to 30 r/min, the rotation speed was about 1000 r/min to about 1500 r/min, and the stirring time was about 1 h to about 4 h, so that the stirring and dispersion were uniform, and a first mixed slurry of the silicon to containing material and the CNTs was obtained.

(3) 2700 g of the graphite material, all the weighed VGCFs, the remaining binder, 0 to 12 g of the other conductive material and an appropriate amount of deionized water were added to the first mixed slurry obtained in step (2). The revolution speed was controlled at about 10 r/min to 30 r/min, the rotation speed was about 1000 r/min to about 1500 r/min, and the stirring time was about 1 hour to about 4 hours, so that the stirring and dispersion were uniform, and a second mixed slurry was obtained.

(4) The second mixed slurry obtained in step (3) was filtered through a 175-mesh double-layer sieve to obtain an anode active material slurry for a lithium ion battery.

By controlling the amount of the deionized water in step (2), the viscosity of the first mixed slurry was controlled at about 10000 mPa·s to about 20000 mPa·s.

By controlling the amount of the deionized water in step (3), the viscosity of the second mixed slurry was controlled at about 2500 mPa·s to about 4000 mPa·s, and the solid content was controlled at about 35% to about 50%.

The amounts of materials and material parameters in the examples and comparative examples are listed in detail in Table 1.

| Embodiments and Comparative Examples | Active material content | CNT content and surface polar group | VGCF content and whether its size and silicon-containing particle size satisfy (L50 − D50)/D50 ≥ 1 (L50 and D50 both in μm) | Other conductive material and content | Type and content of binder |
|---|---|---|---|---|---|
| Example 1 | 300 g SiOx(D50 6 μm) + 2700 g graphite | 1 g, carboxyl group | 39 g, Yes | 0 | 120 g sodium polyacrylate |
| Example 2 | 300 g SiOx(D50 6 μm) + 2700 g graphite | 5 g, carboxyl group | 35 g, Yes | 0 | 120 g sodium polyacrylate |
| Example 3 | 300 g SiOx(D50 6 μm) + 2700 g graphite | 10 g, carboxyl group | 30 g, Yes | 0 | 120 g sodium polyacrylate |
| Example 4 | 300 g SiOx(D50 6 μm) + 2700 g graphite | 5 g, carboxyl group | 35 g, Yes | conductive carbon black, 10 g | 120 g sodium polyacrylate |
| Example 5 | 300 g SiOx(D50 6 μm) + 2700 g graphite | 5 g, carboxyl group | 35 g, Yes | graphene, 10 g | 120 g sodium polyacrylate |
| Example 6 | 300 g SiOx(D50 6 μm) + 2700 g graphite | 5 g, hydroxyl group | 35 g, Yes | 0 | 120 g sodium polyacrylate |
| Example 7 | 300 g SiOx(D50 6 μm) + 2700 g graphite | 5 g, sulfonic acid group | 35 g, Yes | 0 | 120 g sodium polyacrylate |
| Example 8 | 300 g SiOx(D50 6 μm) + 2700 g graphite | 5 g, carboxyl group + sulfonic acid group | 35 g, Yes | 0 | 120 g sodium polyacrylate |
| Example 9 | 300 g SiOx(D50 6 l.tm) + 2700 g graphite | 5 g, carboxyl group | 35 g, Yes | 0 | 120 g sodium alginate |
| Example 10 | 300 g SiOx(D50 6 μm) + 2700 g graphite | 5 g, carboxyl group | 35 g, Yes | 0 | 120 g hydroxymethylcellulose sodium |
| Example 11 | 300 g SiOx(D50 6 μm) + 2700 g graphite | 5 g, carboxyl group | 35 g, Yes | 0 | 60 g sodium polyacrylate + 60 g hydroxymethylcellulose sodium |
| Comparative Example 1 | 300 g SiOx(D50 6 μm) + 2700 g graphite | 5 g, no polar group | 35 g, Yes | 0 | 120 g sodium polyacrylate |
| Comparative Example 2 | 300 g SiOx(D50 6 μm) + 2700 g graphite | 5 g, carboxyl group | 35 g, No | 0 | 120 g sodium polyacrylate |
| Comparative Example 3 | 300 g Si-containing material + 2700 g graphite | 5 g, no polar group | 35 g, No | 0 | 120 g sodium polyacrylate |
| Comparative Example 4 | 300 g SiOx(D50 6 μm) + 2700 g graphite | 0 | 40 g, Yes | 0 | 120 g sodium polyacrylate |
| Comparative Example 5 | 300 g SiOx(D50 6 μm) + 2700 g graphite | 40 g, carboxyl group | 0 | 0 | 120 g sodium polyacrylate |

In short, the preparation methods of Examples 1-11 and Comparative Examples 1-5 are substantially the same, except the difference in the contents of CNTs and VGCFs, the presence or absence of the polar group on the surface of the CNTs and the difference in the type of the polar group, whether the size of the VGCFs and the size of the silicon particles satisfy the relation (L50−D50)/D50≥1, the presence or absence of other conductive material, and the difference in the type of the binder.

Specifically, Examples 1-3 differ only in the difference in the contents of the CNTs and the VGCFs. Examples 2, 4 and 5 differ only in the presence or absence of other conductive material and its type. Examples 2, 6, 7 and 8 and Comparative Example 1 differ only in the presence or absence of the polar group and the type of the polar group. Examples 2, 9, 10 and 11 differ only in the difference in the type of the binder. Example 2 and Comparative Examples 1-3 differ only in whether the CNTs contain a polar group and whether the size of the VGCFs and the size of the silicon particles satisfy the relation (L50−D50)/D50≥1.

2. Characterization of Performance of Anode Materials Obtained in Examples 1-11 and Comparative Examples 1-5

An anode and a lithium ion battery were respectively prepared by using the anode active materials of Examples 1-11 and Comparative Examples 1-5 above, and the electrode resistivity and adhesion of the anode, the first coulombic efficiency of the lithium ion battery, the capacity retention rate after 400 cycles at 25° C., and the full charge expansion ratio after 400 cycles at 25° C. were tested. In addition, in order to better understand the effective three-dimensional conductive network of the present application, the surface morphology of the anode active material obtained in Example 4 was subjected to SEM testing.

Preparation of Lithium-Ion Battery:

Preparation of anode: The anode active material slurry of each of the examples and comparative examples obtained according to step (4) in the previous portion "1. Preparation of anode active material" was coated onto a copper foil current collector, and after drying and cold pressing, the anode was obtained. The coating thickness was about 50 μm to about 200 μm, and the single-sided compacted density of the electrode was about 1.2 g/cm$^3$ to about 2.0 g/cm$^3$.

Preparation of cathode: A cathode active material lithium cobalt oxide, conductive carbon black and a binder polyvinylidene fluoride (PVDF) were sufficiently stirred and uniformly mixed according to a mass ratio of about 96.7:1.7:16 in an N-methylpyrrolidone solvent system, and the mixture was coated on an Al foil, dried, and cold pressed to obtain the cathode.

Separator: Polyethylene (PE) porous polymeric films were used as the separator.

The cathode, the separator and the anode were sequentially stacked to enable the separator to be located between the cathode and anode to play a role of separation. The stack was wound to obtain a bare battery core. The bare battery core was placed in an outer package, the prepared electrolyte (a volume ratio of EC to DEC to DEC was 1:1:1, where the concentration of lithium hexafluorophosphate was about 1 mol/L, and the mass percentage of FEC in the electrolyte was about 10 wt %) was injected, and the battery core was packaged. The lithium ion battery was obtained after formation, degassing, trimming and other processes.

Performance Testing of Anode Active Material, Anode and Lithium Ion Battery

SEM Testing

A scanning electron microscope (SEM) was used for obtaining a morphological structure of a sample through mutual effect of an electron beam and the sample and by using a secondary electron signal for imaging. An SEM used in the present experiment was JSM-6360LV SEM of JEOL Company and a matched X-ray energy spectrometer, which were used for analyzing the morphological structure and element distribution of the sample.

Electrode Resistivity Testing

The electrode resistivity was measured by using a four-probe method. An instrument used in the four-probe method testing was a precision DC voltage current source (SB118 model). Four copper plates which were 1.5 cm long, 1 cm wide and 2 mm thick were fixed on a line equidistantly. A distance between the two copper plates in the middle was L (1 cm to 2 cm). A substrate for fixing the copper plates was an insulating material. During the testing, the lower end surfaces of the four copper plates were pressed on the tested electrode, the copper plates at two ends were connected to a direct current I, voltage V was measured at the two copper plates in the middle, I and V values were read for three times, and the average values of I and V were calculated. After the testing, the thickness d of the electrode material was measured by a spiral micrometer in cm. According to a resistivity formula $\rho = R \cdot S/L$, a resistivity calculation formula $\rho = V \cdot d/(I \cdot L)$ could be derived. $\rho$ was resistivity, in $\Omega \cdot cm$; R was resistance, in $\Omega$; S=sample width (1 cm)*material thickness d; L was a distance between the inner sides of the two copper plates for measuring the voltage, in cm; d was the thickness of the electrode material, in cm; and V and I were the voltage and current values obtained by the testing, in V and mA respectively.

Electrode Adhesion Testing

The adhesions of the anode prepared from the anode active materials of Examples 1-11 and Comparative Examples 1-5 were tested by using a tensile tester. The anode was cut into a size of 15 mm×2 mm, and the cut anode was adhered to a stainless steel plate through a 3M double-sided tape, and placed on the tensile tester to measure the electrode adhesion.

First Coulombic Efficiency of Lithium Ion Battery

The battery was charged at a constant current of 0.5 C to 4.4 V, and further charged at a constant voltage of 4.4 V to a current of lower than 0.025 C to obtain a charge capacity C0 of the lithium ion battery. After standing for 5 minutes, the battery was discharged at a constant current of 0.5 C to 3.0 V to obtain a discharge capacity D0 of the lithium ion battery. D0/C0 was the first coulombic efficiency of the lithium ion battery.

Cyclic Performance Test of Lithium Ion Battery

Five lithium ion batteries prepared by using the electrolyte in comparative examples and Examples were respectively taken and charged and discharged repetitively through the following steps, and the discharge capacity retention rates of the lithium ion batteries were calculated.

In a 25° C. environment, the battery was charged at a constant current of 0.7 C to 4.4 V, further charged at a constant voltage of 4.4 V to a current of lower than 0.025 C, allowed to stand for 5 minutes, and discharged at a constant current of 0.5 C to 3.0 V. The capacity obtained in this step was initial capacity. According to the foregoing steps, a 0.7 C rate charging/0.5 C rate discharging cyclic test was performed, and a capacity decay curve was obtained by taking a ratio of the capacity of each step to the initial capacity.

Full Charge Expansion Ratio Testing of Lithium Ion Battery

The thickness of the initial half-charged lithium ion battery was tested by using a spiral micrometer. At the 400th cycle, the lithium ion battery was in a fully charged state, and then the thickness of the lithium ion battery was tested by using the spiral micrometer, and compared with the thickness of the lithium ion battery in the initial half-charged state to obtain an expansion ratio of the fully charged lithium ion battery at this time.

Figure 2A:
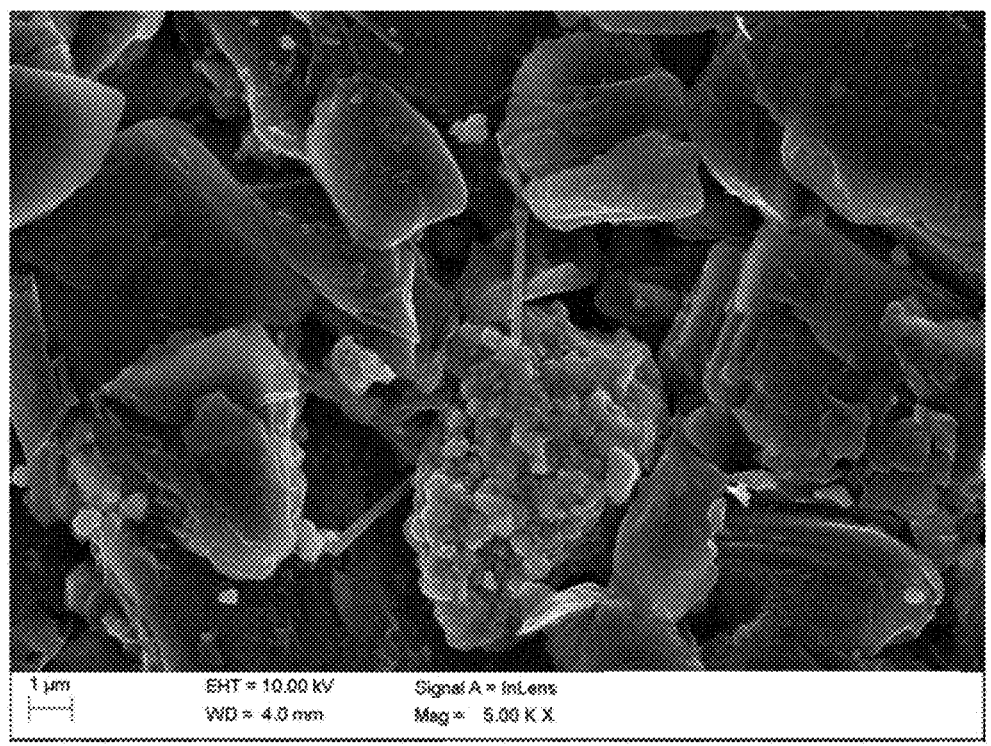
FIG. 2A and FIG. 2B are scanning electron microscope (SEM) images of the silicon-containing anode active material obtained in Example 4 of the present application.
Figure 2B:
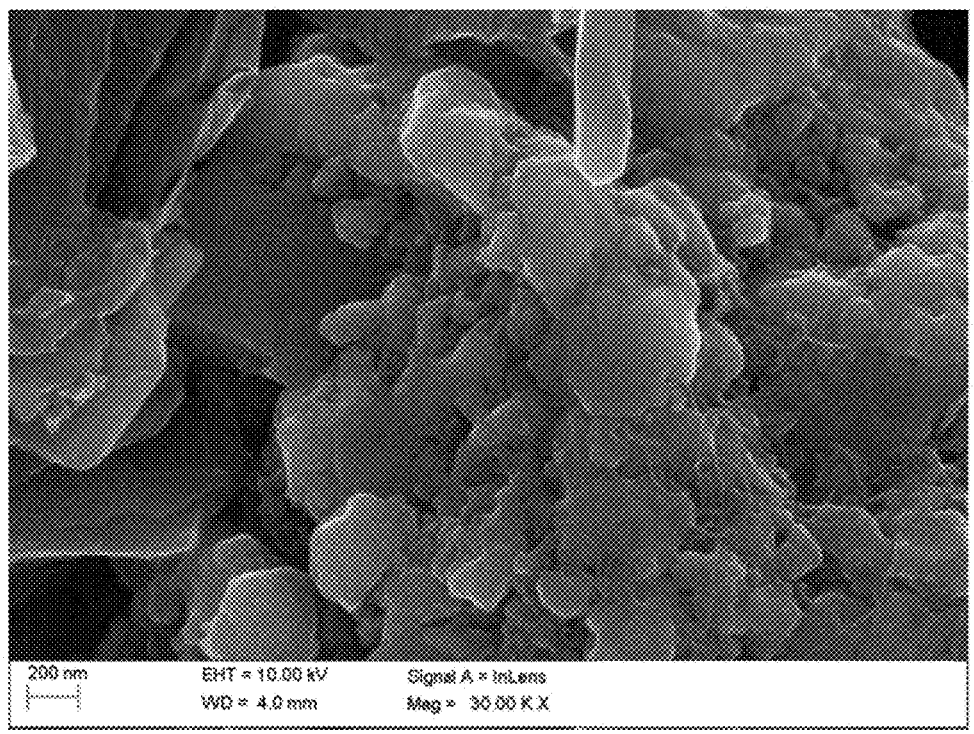

For a more intuitive understanding of the structure of the anode active material in the technical solutions of the present application, reference is made to FIG. 1, FIG. 2A and FIG. 2B. Referring to the schematic view of the three-dimensional conductive network formed by the first conductive material CNTs and the second conductive material VGCFs in the silicon-containing anode shown in FIG. 1, the VGCFs are bridged between the silicon particles and the graphite particles, and the CNTs are coated on the surfaces of the silicon particles and the graphite particles and are bridged between the particles. The CNTs and the VGCFs together form the three-dimensional conductive network containing the silicon particles and the graphite particles. Referring to the surface SEM topography of the anode active material in Example 4 shown in FIG. 2A and FIG. 2B, the VGCFs are bridged between the silicon particles and the graphite particles, and the CNTs are coated on the surfaces of the silicon particles and the graphite particles and are bridged between the particles. The CNTs and the VGCFs together form the three-dimensional conductive network containing the silicon particles and the graphite particles. The size of the silicon particles is 0.5 μm to about 30 μm.

The electrode resistivity and adhesion, and the first coulombic efficiency and test results of the lithium ion batteries of the examples and comparative examples are listed in Table 2.

| Embodiments and Comparative Examples | Electrode resistivity (Ω · m) | Electrode adhesion (N/m) | First coulombic efficiency | Capacity retention rate at 400th cycle (25° C.) | Full charge battery core expansion ratio at 400th cycle at 25° C. |
|---|---|---|---|---|---|
| Example 1 | 0.142 | 60 | 90.0% | 89.5% | 5.1% |
| Example 2 | 0.021 | 57 | 88.5% | 91.0% | 5.5% |
| Example 3 | 0.135 | 54 | 87.2% | 86.4% | 5.8% |
| Example 4 | 0.008 | 58 | 88.0% | 91.5% | 5.4% |
| Example 5 | 0.005 | 61 | 86.5% | 92.0% | 5.0% |
| Example 6 | 0.019 | 55 | 88.7% | 90.8% | 5.6% |
| Example 7 | 0.024 | 56 | 88.4% | 90.6% | 5.6% |
| Example 8 | 0.042 | 58 | 88.2% | 91.2% | 5.3% |
| Example 9 | 0.031 | 57 | 88.6% | 90.9% | 5.4% |
| Example 10 | 0.029 | 62 | 88.8% | 91.5% | 5.1% |
| Example 11 | 0.034 | 65 | 88.9% | 91.9% | 4.9% |
| Comparative Example 1 | 0.001 | 53 | 88.7% | 88.3% | 6.0% |
| Comparative Example 2 | 0.025 | 46 | 88.7% | 87.5% | 6.6% |
| Comparative Example 3 | 0.001 | 42 | 88.8% | 87.0% | 7.0% |
| Comparative Example 4 | 0.876 | 63 | 90.5% | 85.0% | 4.7% |
| Comparative Example 5 | Fail in preparing slurry | | | | |

In the analysis of Examples 1-3 and Comparative Examples 4 and 5, it may be seen that if the conductive material does not contain CNTs and completely depends on the VGCFs to form the three-dimensional conductive network, since the number of the electrical contacts of the VGCFs is small, the overall conductivity of the silicon-containing anode is lowered, so that the cycle performance is worsened. If the conductive material does not contain VGCFs and only contains CNTs, the CNTs cannot be dispersed due to too high content, so that the slurry preparation fails. Therefore, the addition of a single conductive material to the silicon-containing anode cannot effectively form a three-dimensional conductive network and suppress the expansion of the silicon particles.

In the analysis of Examples 1-3, it may be seen that with the increase in VGCF content and the decrease in CNT content, the electrode adhesion may be further enhanced, the expansion ratio of the lithium ion battery may be reduced, and the first coulombic efficiency of the lithium ion battery may be enhanced. The above change rules in performance are mainly because: the increase in VGCF content is beneficial to enhancing the electrode adhesion and reducing the expansion of the battery core, thereby enhancing the overall structural stability of the electrode, mainly because the VGCFs form an effective three-dimensional conductive network structure between particles (referring to FIG. 1 and FIG. 2); and the increase in CNT content will lower the first coulombic efficiency, mainly because the CNTs have a large specific surface area and consume more lithium ions. Due to the excellent conductivity of CNTs, the increase in CNT content may lower the resistivity of the anode. However, when the CNT content is too high, excessive CNTs will cause difficulty in processing, and the CNTs are easier to agglomerate, resulting in the increase in the electrode resistivity, thereby further causing the worsening of the cycle performance. Therefore, the CNT content should be selected appropriately. In the embodiments of the present application, the content of the CNTs is preferably about 5 g (at this time, the mass percentage of the CNTs in the total conductive materials is about 12.5%).

In the analysis of Examples 2, 4 and 5, it may be seen that in addition to CNTs and VGCFs, the addition of the additional conductive material may further lower the resistivity of the anode and enhance the cycle performance of the lithium ion battery, mainly because the addition of the additional conductive material increases the electrical contacts between the silicon particles and the graphite particles and perfects the three-dimensional conductive network. The two-dimensional conductive material graphene may be coated on the surface of the silicon particles to suppress the expansion of the silicon particles, thereby enhancing the cycle performance.

In the analysis of Examples 2, 6, 7 and 8 and Comparative Example 1, it may be seen that compared with the anode active material including the CNTs containing no polar group, the anode prepared from the anode active material including the CNTs containing a polar group has better adhesion, and the lithium ion battery prepared therefrom has a better capacity retention rate at the 400th cycle and full charge expansion ratio. When the surface of the CNTs in the anode active material contains different polar groups, the adhesion of the anode prepared therefrom and the capacity retention rate at the 400th cycle and the full charge expansion ratio of the lithium ion battery prepared therefrom are improved to different degrees. When the surface of the CNTs in the anode active material contains multiple different polar groups, it is more favorable for the dispersion of the CNTs, and the polar groups on the surface of the CNTs and the groups on the surface of the silicon particles form more bonding effects, so that the strength of the CNTs coated on the surface of the silicon particles is enhanced, thereby better restraining the expansion of the silicon particles, and enhancing the cycle performance of the lithium ion battery prepared from the silicon-containing material.

In the analysis of Examples 2, 9, 10 and 11, it may be seen that when the polar group accommodated in the binder has a bonding effect with the polar group on the surface of the CNTs, the CNTs may be better combined with the binder, and the adhesion of the electrode may be further enhanced. Particularly in Example 11, the binder composed of polyacrylic acid and hydroxymethylcellulose sodium contains different polar groups and provides two kinds of adhesion, and the bonding effect may occur between polar groups, which is more advantageous for enhancing the adhesion of the electrode and restraining the expansion of the silicon particles, thereby enhancing the cycle performance of the lithium ion battery.

In the analysis of Example 2 and Comparative Examples 1, 2 and 3, especially comparing Example 2 with Comparative Example 1 and comparing Example 2 with Comparative Example 2 respectively, it may be seen that when the CNTs contain a carboxyl group, the electrode has better adhesion, and the lithium ion battery has a better capacity retention rate at the 400th cycle and a better expansion ratio. This is mainly because when the CNTs contain the carboxyl group, the CNTs are easily dispersed, and the CNTs have a better coating effect on the surface of the silicon particles, and may effectively conduct electricity and suppress the expansion of the silicon particles. Comparing Example 2 with Comparative Example 2 and Comparative Examples 1 and 3 respectively, it may be seen that when the size of the VGCFs and the size of the silicon particles satisfy the relation (L50−D50)/D50≥1, the electrode has better adhesion, and the lithium ion battery has a better capacity retention rate at the 400th cycle and a better expansion ratio. This is mainly because when the size of the VGCFs and the size of the silicon particles satisfy the relation (L50−D50)/D50≥1, the VGCFs may be effectively bridged between the silicon particles and the graphite particles, and may form an effective three-dimensional conductive network, thereby effectively suppressing the displacement of the silicon particles, and further improving the expansion ratio and cycle performance of the lithium ion battery.

Based on the above, the effective three-dimensional conductive network formed by the two conductive materials CNTs and VGCFs is superior to a structure formed by one of them. The mass percentage of the CNTs in the total conductive materials is preferably about 5% to about 30%. The addition of an appropriate amount of the additional conductive material may further effectively improve the three-dimensional conductive network. The polar group accommodated on the surface of the CNTs may further facilitate the dispersion of the CNT and enable the CNTs to be uniformly coated on the surface of the silicon particles to form a three-dimensional conductive network on the surface of the silicon particles, thereby effectively suppressing the expansion of the silicon particles. The polar groups of the binder may act with the polar group of the CNTs, and the polar groups between the binders may interact, which may further enhance the adhesion of the electrode and enhance the stability of the electrode, thereby enhancing the cycle performance of the silicon-containing anode. When the size of the VGCFs and the size of the silicon particles satisfy the relation (L50−D50)/D50≥1, the VGCFs may be further effectively bridged between the active particles, a conductive network is formed in the entire electrode, and the displacement of the silicon particles is suppressed.

Described above are embodiments listed in the present application. However, since the applicant cannot exhaust all the embodiments, all other equivalent embodiments which are obtained based on the teaching of the present application fall within the protective scope of the present application. Compared with the prior art, the present application has at least one or more of the following beneficial technical effects: since the anode active material particles containing silicon are contained in the effective three-dimensional conductive network formed by the first conductive material and the second conductive material, the expansion of the silicon particles during the cycle is effectively suppressed, and the conductivity between the particles is enhanced, thereby further improving the electrochemical performance of the lithium ion battery. In addition, the preparation method in the present application is simple, easy to operate and control, having a low cost, and is suitable for industrial production.

In summary, the present application provides a method that is simple and easy to implement and suitable for industrial production to provide a silicon-containing anode material having high conductivity, high cycle performance and low cycle expansion ratio.

References to "some embodiments", "part of embodiments", "one embodiment", "another example", "example", "specific example" or "part of examples" in the whole specification mean that at least one embodiment or example in the present application comprises specific features, structures, materials or characteristics described in the embodiment or example. Therefore, the descriptions appearing throughout the specification, such as "in some embodiments", "in an embodiment", "in one embodiment", "in another example", "in one example", "in a specific example" or "an example" do not necessarily refer to the same embodiment or example in the present application. Furthermore, the specific features, structures, materials or characteristics in the descriptions can be combined in any suitable manner in one or more embodiments or examples.

The abstract of the present specification summarizes the features of several embodiments, which will enable those of ordinary skill in the art to understand the various aspects of the present application. Those of ordinary skill in the art can readily use the present application as a basis for designing or modifying other compositions to achieve the same objectives and/or the same advantages as the embodiments herein. It is also to be understood by those of ordinary skill in the art that these equal examples do not depart from the spirit and scope of the present application, and it is possible to make various changes, substitutions and modifications to the present application without departing from the spirit and scope of the present application. Although the methods disclosed herein have been described with reference to the specific operations that are performed in a specific order, it should be understood that these operations can be combined, subdivided, or reordered to form an equivalent method without departing from the teachings of the present application. Therefore, the order and grouping of operations are not a limitation to the present application unless specifically indicated herein.

What is claimed is:

1. An anode active material, comprising anode active particles having silicon element, a first conductive material and a second conductive material, wherein
   the first conductive material and the second conductive material form a three-dimensional conductive network structure;
   at least a portion of the anode active particles are accommodated in the three-dimensional conductive network structure; and
   a ratio of a total surface area of the first conductive material to a total surface area of the anode active particles is less than about 1000, wherein the first conductive material has a length to diameter ratio of about 50 to about 3000 and a diameter of about 2 nm to about 30 nm;

the second conductive material has a length to diameter ratio of about 20 to about 500 and a diameter of about 50 nm to about 500 nm;

the anode active particles have an average diameter D50 of about 0.5 μm to about 30 μm, and an average length L50 of the second conductive material and the D50 of the anode active particles satisfy: (L50−D50)/D50≥1, the L50 and the D50 being both in μm; and the first conductive material comprises carbon nanotubes containing at least one polar group, and the second conductive material comprises carbon fibers.

2. The anode active material according to claim 1, wherein a mass of the first conductive material accounts for about 5% to about 30% of a mass of total conductive materials.

3. The anode active material according to claim 1, wherein a ratio of a total mass of the first conductive material and the second conductive material to a total mass of the anode active particles is about 1:100 to about 5:100.

4. The anode active material according to claim 1, wherein the carbon fibers comprise vapor grown carbon fibers VGCFs, carbon nanofibers or a combination of them.

5. The anode active material according to claim 1, wherein the first conductive material is bonded to a surface of the anode active particles by one or more covalent bonds.

6. The anode active material according to claim 1, wherein the anode active particles comprise a simple substance of silicon, a compound of silicon, an alloy of silicon or any combination of the above.

7. The anode active material according to claim 6, wherein the anode active particles comprise $SiO_x$, x=0.5 to 1.5, and the $SiO_x$ comprises crystalline $SiO_x$, amorphous $SiO_x$ or a combination of them.

8. The anode active material according to claim 1, wherein at least a portion of the surface of the anode active particles is coated with an oxide.

9. The anode active material according to claim 1, further comprising a third conductive material, wherein a mass of the third conductive material accounts for about 1% to about 20% of a mass of total conductive materials.

10. The anode active material according to claim 9, wherein the third conductive material comprises conductive carbon black, acetylene black, Ketjen black, conductive graphite, graphene or any combination of the above.

11. The anode active material according to claim 1, wherein the anode active particles further comprise a carbon material.

12. The anode active material according to claim 11, wherein the carbon material comprises artificial graphite, natural graphite or a combination thereof, the artificial graphite or the natural graphite comprising mesocarbon microbeads, soft carbon, hard carbon or any combination of the above.

13. The anode active material according to claim 1, further comprising a binder.

14. An anode, comprising a current collector and anode active material, wherein the anode active material is coated on at least one surface of the current collector, wherein the anode active material comprising anode active particles having silicon element, a first conductive material and a second conductive material, wherein the first conductive material and the second conductive material form a three-dimensional conductive network structure;

at least a portion of the anode active particles are accommodated in the three-dimensional conductive network structure; and a ratio of a total surface area of the first conductive material to a total surface area of the anode active particles is less than about 1000, wherein the first conductive material has a length to diameter ratio of about 50 to about 3000 and a diameter of about 2 nm to about 30 nm;

the second conductive material has a length to diameter ratio of about 20 to about 500 and a diameter of about 50 nm to about 500 nm:

the anode active particles have an average diameter D50 of about 0.5 μm to about 30 μm, and an average length L50 of the second conductive material and the D50 of the anode active particles satisfy: (L50−D50)/D50≥1, the L50 and the D50 being both in μm; and the first conductive material comprises carbon nanotubes containing at least one polar group, and the second conductive material comprises carbon fibers.

15. The anode according to claim 14, wherein the anode has a thickness of about 50 μm to about 200 μm, a single to sided compacted density of about 1.2 g/cm³ to about 2.0 g/cm³ and a resistivity of about 0.001 Ω·cm to about 1000 Ω·cm.

16. The anode according to claim 14, wherein a peel strength between the anode active material and the current collector is greater than about 20 N/m.

17. An electrochemical device, comprising:
a cathode;
an anode;
a separator; and
electrolyte,
wherein the anode comprises anode active particles having silicon element, a first conductive material and a second conductive material, wherein the first conductive material and the second conductive material form a three-dimensional conductive network structure;

at least a portion of the anode active particles are accommodated in the three-dimensional conductive network structure; and a ratio of a total surface area of the first conductive material to a total surface area of the anode active particles is less than about 1000, wherein the first conductive material has a length to diameter ratio of about 50 to about 3000 and a diameter of about 2 nm to about 30 nm;

the second conductive material has a length to diameter ratio of about 20 to about 500 and a diameter of about 50 nm to about 500 nm;

the anode active particles have an average diameter D50 of about 0.5 μm to about 30 μm, and an average length L50 of the second conductive material and the D50 of the anode active particles satisfy: (L50−D50)/D50≥1, the L50 and the D50 being both in μm; and the first conductive material comprises carbon nanotubes containing at least one polar group, and the second conductive material comprises carbon fibers.

* * * * *